United States Patent [19]

Plank et al.

[11] 4,001,106

[45] Jan. 4, 1977

[54] CATALYTIC CONVERSION OF HYDROCARBONS

[75] Inventors: Charles J. Plank, Woodbury; Edward J. Rosinski, Almonesson, both of N.J.

[73] Assignee: Mobil Oil Corporation, New York, N.Y.

[22] Filed: Aug. 15, 1973

[21] Appl. No.: 388,682

Related U.S. Application Data

[63] Continuation of Ser. No. 548,376, May 9, 1966, Pat. No. 3,769,202, which is a continuation-in-part of Ser. No. 291,585, June 28, 1963, abandoned, and Ser. No. 455,648, May 13, 1965, abandoned, which is a continuation-in-part of Ser. No. 210,215, July 15, 1962, abandoned, and Ser. No. 242,594, Dec. 6, 1962, abandoned, said Ser. No. 291,585, is a continuation-in-part of Ser. No. 210,215, , and Ser. No. 242,594.

[52] U.S. Cl. ................................. 208/75; 208/59
[51] Int. Cl.$^2$ ..................................... C10G 37/02
[58] Field of Search ............... 208/59, 61, 67, 111, 208/120, 75

[56] References Cited

UNITED STATES PATENTS

| | | | |
|---|---|---|---|
| 2,962,435 | 11/1960 | Fleck et al. | 208/120 |
| 3,140,253 | 7/1964 | Plank et al. | 208/120 |
| 3,254,017 | 5/1966 | Arey et al. | 208/111 |
| 3,287,252 | 11/1966 | Young | 208/59 |
| 3,385,781 | 5/1968 | Hamner et al. | 208/59 |
| 3,758,402 | 9/1973 | Oleck et al. | 208/120 |
| 3,758,403 | 9/1973 | Rosinski et al. | 208/111 |
| 3,764,520 | 10/1973 | Kimberlin et al. | 208/120 |

*Primary Examiner*—Delbert E. Gantz
*Assistant Examiner*—James W. Hellwege
*Attorney, Agent, or Firm*—Charles A. Huggett; Raymond W. Barclay

[57] ABSTRACT

A process for cracking a hydrocarbon material in two separate reaction zones, each of which contains a different crystalline aluminosilicate zeolite, one of such zeolites having a pore size of less than 7 Angstrom units and the other of such zeolites having a pore size greater than 8 Angstrom units.

12 Claims, No Drawings

CATALYTIC CONVERSION OF HYDROCARBONS

The present application is a continuation of our copending application Ser. No. 548,376, filed May 9, 1966 and issued as U.S. Pat. No. 3,769,202 on Oct. 30, 1973, which is a continuation-in-part of our copending applications Ser. No. 291,585, filed June 28, 1963 and Ser. No. 455,648 filed May 13, 1965 which in turn are continuations-in-part of application Ser. No. 210,215 filed July 16, 1962 and application Ser. No. 242,594 filed Dec. 6, 1962, all now abandoned.

This invention is directed toward a novel process for the catalytic cracking and hydrocracking of hydrocarbons utilizing catalyst compositions containing a plurality of individual catalytically active components, physically admixed with each other so as to mutually coact in a given environment to produce enhanced results.

The cracking and hydrocracking of hydrocarbons to produce lower boiling hydrocarbons and, in particular, hydrocarbons boiling in the motor fuel range, is an operation upon which a vast amount of time and effort has been spent in view of its tremendous commercial significance. Such conversions have been carried out thermally and catalytically in a fixed bed, moving bed, and fluidized bed. The catalysts suggested for catalytic cracking include solid materials which behave in an acidic manner such as synthetic silica-alumina and silica-magnesia composites or materials of an argillaceous nature, e.g., bentonite and montomorillonite, which have been acid treated. Hydrocracking catalysts usually comprise a hydrogenation-dehydrogenation component deposited on an acidic support such as silica-alumina, silica-magnesia, silica-zirconia, silica-boria, silica-titania, alumina, acid treated clays, pumice and the like. The mechanisms involved in either a cracking or hydrocracking reaction are extremely complex and is not completely understood in spite of the vast amount of time and effort spent in attempting to master it. However, it is known that, aside from the scission of carbon atoms to produce compounds of lower molecular weight, the reactions which accompany such conversions include the formation of a smaller paraffin and an olefin from a larger paraffin; the formation of two olefins from a hydroaromatic compound; the formation of two small olefins from a larger olefin; the formation of an aromatic compound and hydrogen from a hydroaromatic compound; the formation of aromatics and hydrogen from paraffins; the reaction between a hydroaromatic compound and an olefin to produce an aromatic compound and a paraffin; saturation of olefins to produce paraffins by other hydrogen transfer reactions; olefin isomerization; paraffin isomerization; cyclo-olefin isomerization; cycloparaffin isomerization; rearrangement of alkyl groups in aromatics; redistribution of alkyl groups between two aromatics; dehydrogenation of paraffin to olefins; dehydrogenation of naphthenes to olefins; cyclization of olefins to naphthenes; dehydrocyclization of paraffins to naphthenes; dealkylation of alkyl aromatic compounds; hydrogen transfer reactions; hydrogenation of all types of unsaturated species, etc.

From the foregoing it can easily be seen that some of the reactions which accompany a commercial cracking or hydrocracking operation yield products which are highly desirable while other yield products which are less desirable or even undesirable. Therefore, the attempt to find an "ideal" catalyst from a chemical point of view presents many complicated theoretical problems.

However, it should be understood that a commercial cracking or hydrocracking operation by its very nature demands that a catalyst possess certain properties independent of its chemical activity and/or selectivity. For example, since cracking operations are carried out at high temperatures, the catalyst must be chemically and physically stable at these temperatures. Additionally, in view of the fact that commercial operations generally involve deposition of coke on the catalyst so that the catalyst must be subject to several regenerations during its life, the catalyst must also be stable at the regeneration temperatures. Additionally, the catalyst must have a high degree of attrition resistance and mechanical stability. The requirement of chemical stability will be appreciated when it is considered that during the hydrocracking cycle the catalyst is exposed to a wide variety of vapors including hydrocarbon vapors, sulfur and nitrogen compounds and water vapors. Additionally, during the regeneration cycle the catalyst can be exposed to sulfur dioxide, carbon monoxide, carbon dioxide, water varpor, as well as nitrogen compounds. Physical stability or the ability to resist attrition is required of the catalyst in view of the high temperatures reached in the regeneration step and because it is subjected to considerable mechanical strain from external sources such as temperature fluctuations and impact loading.

The presently practiced commercial catalytic cracking and hydrocracking operations, although employing catalysts which pass the majority of the above-enumerated requirements, nevertheless represent a compromise between catalytic activity, catalytic selectivity, maximum yield of gasoline, maximum productivity of the unit per hour, octane number or quality of gasoline obtained, amount of coke formed, etc. In this regard it should be again apparent that in view of the wide variety of complex reactions which by necessity accompany a cracking operation, it is a practical impossibility to arrive at a catalyst which will completely allow certain desirable reactions to occur while completely excluding others. Additionally, it should also be noted that the catalyst with the highest activity is not necessarily the catalyst with the highest selectivity and vice versa. Therefore, it is not only important to consider the fact that a particular catalyst can cause a gas oil to undergo chemical reactions, but it is also necessary to consider the extent to which the reaction or reactions can be directed towards a given product or products.

As it has been previously stated, the reaction mechanisms of a commercial cracking or hydrocracking operation are not completely understood, but nevertheless it is generally accepted that cracking with present commercial catalysts proceeds at different relative rates for different classes of hydrocarbons and that this rate can generally be set forth as follows in decreasing ease of cracking:

1. Alkyl aromatic compounds particularly with alkyl groups of two or more carbon atoms to dealkylated cracking products.
2. Naphthenes.
3. Iso-aliphatics.
4. Normal aliphatics.

From the above it can be seen that heretofore cracking and hydrocracking operations sacrificed a relatively large portion of the feed and intermediate reaction products since a substantially insignificant amount of desired products were obtained from normal aliphatic hydrocarbons. In this regard it is also well to point out that conventional recycle operations do not satisfactorily solve the problems encountered in cracking normal aliphatic hydrocarbons since many of the other compounds contained in the recycle charge are more often times than not more easily attacked by the catalysts than the normal aliphatic hydrocarbons desired to be cracked. The problem of cracking normal aliphatic hydrocarbons cannot be solved by the simple expedient of employing a catalyst which is specifically selective for this particular class of hydrocarbons. As is obvious, the feed stream in a commercial unit is composed of a wide variety of hydrocarbons including aromatics, acyclic, alicyclics, olefins, cycloolefins, cycloparaffins, etc., and any selectivity toward the cracking of normal aliphatic hydrocarbons would be at the expense of cracking the other components of the feed stream so that the net result would be an even poorer yield of gasoline.

It should be apparent that if a catalyst could be found which would continue to crack the majority of components in a feed stream as is presently done by commercial catalysts and also have the property of cracking normal aliphatic paraffins to a higher degree than has been practiced, a revolutionary development would be obtained.

This invention is directly concerned with novel catalyst compositions which will, in fact, accomplish the above set forth objective. The catalyst compositions of this invention will catalyze the cracking of normal paraffins while at the same time catalyze the cracking of the other components in a conventional feed stream to produce gasoline, thereby enhancing the productivity of the reaction system.

The novel catalyst systems of this invention comprise a mixture of at least two different cracking components, one being a catalyst of generalized competence, i.e., a catalyst having general activity for cracking of the several types of hydrocarbons found in commercial gas oil and the other being an aluminosilicate having a maximum uniform pore opening, or port, (usually called "pore size") of a size less than 7 Angstrom units and preferably between 5 and 6.8 Angstrom units.

The novel process of the instant invention is based upon using a catalyst system containing at least two cracking components, wherein each component acts differently upon a hydrocarbon charge. The catalyst of generalized competence is one which can act upon and crack substantially all of the several types of hydrocarbons normally found in commercial gas oil. However, the second component of the catalyst system cannot act upon all of the several species of hydrocarbons present but rather can act only upon normal paraffins. While not wishing to be bound by any theory of operation, it nevertheless appears that in order to adequately provide any kind of catalytic action on a particular species, when employing a solid catalyst, that species must be able to enter within the internal pore structure of the solid catalyst. Therefore, by utilizing as one of the components an aluminosilicate having a pore size less than 7 Angstrom units, only normally aliphatic hydrocarbons will be selectively admitted from mixtures of these hydrocarbons with other compounds and therefore only the normal aliphatic hydrocarbons will be cracked to useful products. Therefore, the heart of the instant invention involves using a catalyst system comprising two cracking components, one being able to exert general cracking activity upon substantially all of the various species of hydrocarbons present in a commercial feed stream and the other being selective for normal paraffins. The mutual co-action of these two cracking components in a given environment produces outstanding results in regard to the quality and quantity of gasoline obtained which cannot be reproduced by using either of the two active components individually.

For purposes of this invention the expression "pore size", as used herein in connection with aluminosilicates, refers to the apparent pore size, as distinguished from the crystallographic pore diameter. The apparent pore size may be defined as the maximum critical dimension of the molecular species which is adsorbed by the aluminosilicate in question, under normal conditions. Maximum critical dimension may be defined as the diameter of the smallest cylinder which will accommodate a model of the molecule constructed using the best available values of bond distances, bond angles, and Van der Waals radii. Crystallographic pore diameter is defined as the free diameter of the appropriate silicate ring in the zeolite structure as calculated from X-ray diffraction analysis. The apparent pore size for a given aluminosilicate is always larger than the crystallographic pore diameter.

The benefits arising from the novel catalyst system of this invention will vary widely depending upon the particular cracking catalyst of generalized competence which is admixed with the aluminosilicate having a pore size less than 7 Angstrom units.

As has heretofore been pointed out, cracking catalysts or the cracking component in the hydrocracking catalysts suggested by the prior art represented a compromise between various desirable factors including activity, selectivity, octane number, amount of coke formed, etc. Therefore, the various types of catalysts heretofore suggested by the prior art performed one or more of the desired functions but always at the expense of sacrificing other desirable attributes. For example, catalysts have heretofore been proposed which give a higher yield of gasoline than others but generally this higher yield of gasoline is at the expense of octane number. Conversely, catalysts have been proposed which give gasolines having a relatively high octane number but this high octane number is generally obtained at the expense of yield.

The benefits accruing from the novel catalyst systems of this invention directly stem from the increased cracking of normal aliphatic hydrocarbons but the specific way in which the benefit would be evident would vary in that the increased cracking of normal aliphatic paraffins would enhance those desirable attributes sacrificed by the cracking catalyst in order to obtain other desired attributes. Thus, it can be stated that this invention makes up, to a substantial degree, the inherent deficiency or deficiencies sacrificed by the prior art workers in arriving at a catalyst to perform to a greater degree certain other functions.

While not wishing to indulge in a great oversimpplification of both the theory and the increased benefits flowing from the novel systems of this invention, nevertheless certain generalizations can be made with a reasonable degree of accuracy. If a catalyst composite is formulated employing as the catalyst of generalized competence a component having the inherent property of being able to produce gasoline of a relatively high octane number, then the use of said component in conjunction with the aluminosilicate having a pore size less than 7 Angstrom units will result in the production of gasoline having an octane number substantially the same as that which would be obtained from the use of the cracking constituent alone but at much higher yields. Therefore, in the above example, the novel catalyst compositions of this invention would directly remedy, to a substantial extent, the inherent deficiency in yield of conventional cracking catalysts which produce relatively high octane gasoline On the other hand, if the catalyst of generalized competence is one having a relatively high activity in that it is able to produce higher yields of gasoline, with the inherent deficiency that the gasoline thus produced has a lower octane number, then the benefit accurring from pronounced cracking of normal aliphatic paraffins would be that gasoline would be produced in substantially the same yield as would be obtained if the cracking constituent were separately employed, but at a higher octane number.

From the above generalities it can be seen that the contribution of this invention to the art is one of almost revolutionary proportions in that the compromise which the prior art inherently was forced to make in the selection of a cracking component would be substantially eliminated.

Still another advantage of the process of this invention is that it gives the refiner a high degree of flexibility in regard to both the nature and yield of the products obtained from his installation. It should be immediately apparent that there are a wide variety of products which can be obtained from the commercial cracking and hydrocracking installation and the products are governed by economic considerations. erations. It should also be apparent that economic considerations are not static but change quite frequently, so that what is the most profitable product balance for one period of time is not necessarily the most profitable for another. For example, the quantity of fuel oil consumed in the winter is far greater than the quantity consumed in the summer so that an installation which produces a given amount of fuel oil per unit volume of charge does not operate at its maximum economic efficiency all year round. The catalyst system proposed would give the refiner another way to vary the products obtained from his reactor simply by controlling the extent to which normal aliphatic hydrocarbons are cracked.

As has heretofore been set forth, the novel catalyst systems of this invention comprise a mixture of at least two different cracking components, one being a cracking catalyst of generalized competence and the other being an aluminosilicate, preferably a crystalline aluminosilicate zeolite having a pore size less than 7 Angstrom units and preferably between 5 and 6.8 Angstrom units. For hydrocracking operations a hydrogenation-dehydrogenation component is admixed with at least one of the cracking components. The cracking catalyst of generalized competence which can be employed to prepare the novel composites of this invention include a wide variety of materials most of which are well known in the art and have been suggested for use in a wide variety of commercial cracking operations. The most common cracking catalysts of generalized competence include acid-treated clays, dried inorganic oxide gels and gelatinous precipitates of alumina, silica, zirconia, magnesia, thoria, titania, boria, as well as combinations of these oxides with one another and with other components such as silica-alumina, silica-magnesia, silica-zirconia, silica-boria, silica-titania, fluorides or fluoroborates on silica-alumina or alumina carriers, etc. The above conventional solid cracking catalysts generally have an effective pore diameter within the range of 30 to 10,000 Angstrom units and additionally have a porosity of at least 0.05 cubic centimeters per gram. It is to be understood, however, that the catalyst of general competence must have sufficiently large pores so that the various types of hydrocarbons normally found in commercial gas oil will be able to enter and be acted upon. It has been found that, generally, solids having a pore size greater than 8 Angstrom units will accomplish this objective.

However, the most preferred embodiment of this invention resides in the use of a crystalline aluminosilicate zeolite having a pore size greater than 8 Angstrom units as the catalysts of generalized competence in the novel composites of this invention. Although conventional cracking catalysts such as those above referred to, when combined with aluminosilicates having a pore size less than 7 Angstrom units give improved results, nevertheless it appears that the process of this invention can be maximized both in terms of activity and selectivity when aluminosilicates having pore sizes greater than 8 are combined with aluminosilicates having pore sizes than 7 Angstrom units.

The aluminosilicates which can be employed in the catalyst systems of the invention have a crystalline and/or cryptocrystalline structure and consist basically of a rigid, three-dimensional framework of $SiO_4$ and $AlO_4$ tetrahedra in which the tetrahedra are crosslinked by the sharing of oxygen atoms whereby the ratio of the total aluminum and silicon atoms to oxygen atoms is 1:2. In their hydrated form the aluminosilicates may be represented by the following formula:

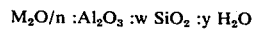

wherein M represents at least one ion of positive valence which balances the electrovalence of the tetrahedra, n represents the valence of the ion, $w$ the moles of $SiO_2$ and $y$ the moles of $H_2O$. The ions of positive valence can be any one or more of a number of metal ions, hydrogen ions and ammonium ions depending upon whether the aluminosilicate is synthesized or occurs naturally. The ions of positive valence as well as the silicon, aluminum, oxygen, in the aluminosilicate are arranged in the form of a crystalline salt in a definite and consistent crystalline pattern. The structure contains a large number of still smaller holes or channels. These cavities and channels are uniform in size.

Aluminosilicates having a pore size less than 7 Angstrom units, and preferably 5 to 6.8 Angstrom units, are well known in the art and include a wide variety of materials, both natural and synehetic. Examples of aluminosilicates which can be employed would include chabazite, gmelinite, clinoptilolite, erionite (offretite), Zeolites A, T, as well as Zeolite α, ZK-4 and ZK-5.

ZK-4 can be represented in terms of mole ratios of oxides as:

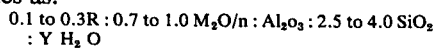

wherein R is a member selected from the group consisting of methylammonium oxide, hydrogen oxide and mixtures thereof with one another, M is a metal cation of n valence, and Y is any value from about 3.5 to 5.5.

As synthesized, Zeolite ZK-4 contains primary sodium cations and can be represented by unit cell formula:

$$Na_{7.5\pm 2}H_{2\pm.5}(9\pm 2\ AlO_2 \cdot 15\pm 2\ SiO_2)$$

ZK-4 can be prepared by preparing an aqueous solution of oxides containing $Na_2O$, $Al_2O_3$, $SiO_2$, $H_2O$ and tetramethylammonium ion having a composition, in terms of oxide mole ratios, which falls within the following ranges:

| | |
|---|---|
| $SiO_2/Al_2O_3$ | 2.5 to 11 |
| $\dfrac{Na_2O}{Na_2O + [(CH_3)_4N]_2O}$ | 0.05 to 0.25 |
| $\dfrac{H_2O}{Na_2O + [(CH_3)_4N]_2O}$ | 25 to 50 |
| $\dfrac{Na_2O + [(CH_3)_4N]_2O}{SiO_2}$ | 1 to 2 | maintaining the mixture at a temperature of about 100° to 120° C. until the crystals are formed, and separating the crystals from the mother liquid. The crystal material is thereafter washed until the wash effluent has a pH essentially that of wash water and subsequently dried.

Zeolite α can be represented in terms of mole ratios of oxides as follows:

$$0.2\ \text{to}\ 0.4\ R : 0.6\ \text{to}\ 0.8\ M_2O/n : Al_2O_3 : 4.0\ \text{to}\ 6.0\ SiO_2 : Y\ H_2O$$

wherein R is a member selected from the group consisting of methylammonium oxide, hydrogen oxide and mixtures thereof, M is a metal cation of n valence and y the moles of $H_2O$.

Zeolite α is prepared in a similar manner as ZK-4 with the exception that mole ratio of silica to alumina is at least 20 to 1, the mole ratio of $8\ (CH_3)_4N]_2O$ to $Na_2O$ is about 10 to 1 and the forming temperature is about 60 to 90° C.

ZK-5 can be represented by composition in terms of mole ratios of oxides as:

$$0.3\ \text{to}\ 0.7\ R_2O/m : 0.3\ \text{to}\ 0.7\ M_2O/n : 1\ Al_2O_3 : 4.0\ \text{to}\ 6.0\ SiO_2 \cdot YH_2O$$

wherein R is selected from the group consisting of a nitrogen-containing cation derived from N,N'-dimethyltriethylenediammonium ion and mixtures of said carton with hydrogen and m is the valence thereof; M is a metal and n the valence thereof and Y is any value from about 6 to about 10.

ZK-5 can be prepared by preparing an aqueous solution of oxides containing $Na_2O$, $Al_2O_3$, $SiO_2$, $H_2O$ and N,N'-dimethyltriethylenediammonium ion having a composition, in terms of oxide mole ratios, which falls within the following ranges:

| | |
|---|---|
| $SiO_2/A/_2O_3$ | of from about 2.5 to 15 |
| $\dfrac{Na_2O}{Na_2O + C_8H_{18}N_2O}$ | of from about .01 to 0.25 |
| $\dfrac{H_2O}{Na_2O + C_8H_{18}N_2O}$ | of from about 25 to 50 |
| $\dfrac{Na_2O + C_8H_{18}N_2O}{SiO_2}$ | of from about 1 to 2 | maintaining the mixture at a temperature of about 90° C. to 120° C. until the crystals are formed, and separating the crystals from the mother liquor. The crystal material is thereafter washed until the wash effluent has a pH essentially that of wash water and subsequently dried.

Aluminosilicates having a pore size greater than 8 Angstrom units are also well known and include both natural and synthetic materials such as Zeolites 10X, 13X, Y, L, faujasite, etc.

Although the majority of aluminosilicates usually occur naturally or are synthesized in the form of their alkali or alkaline earth metal salts, this invention also includes acid aluminosilicates, acid-metal aluminosilicates and metal aluminosilicates broadly.

Acid aluminosilicates are those compositions wherein substantially all of the metallic cations originally present of an aluminosilicate are replaced with protons or proton precursors. These compositions are prepared by treating a precursor aluminosilicate with an aqueeous or fluid medium containing a source of hydrogen ions or ions capable of conversion thereto, e.g., an ammonium ion.

In carrying out the treatment with the fluid medium, the procedure comprises contacting an aluminosilicate precursor material are replaced with non-metallic ions of positive valence. Except for alkali metal cations which may be present as impurities to the extent of less than 0.25 equivalents, and preferably less than 0.1 equivalents pre gram atom of aluminum, essentially no other metallic cations are associated with the resulting acid aluminosilicate. Effective treatment with the fluid medium to obtain the corresponding acid aluminosilicate will vary with the duration of the treatment and temperature at which it is carried out. Elevated temperatures tend to hasten the speed of treatment whereas the duration thereof varies inversely with the hydrogen ion or ammonium ion concentration of the fluid medium. In general, it may be stated that the temperature employed range from below ambient room temperature of 24° C. up to temperatures below the decomposition temperature of the aluminosilicate. Following the fluid treatment, the treated aluminosilicate may be washed with water, preferably distilled or deionized water, until the effluent wash water has a pH value of wash water, i.e., between about 5 to 8. The aluminosilicate is thereafter dried and activated by heating in an inert atmosphere at temperatures ranging from about 400° to 1500° F. whereby ammonium ions, if present undergo conversion to hydrogen ions.

In a similar manner base exchange can be carried out with a wide variety of metal salts utilizing such metal cations as rare earth, aluminum, manganese, calcium, barium, strontium, berylium and mixtures thereof with hydrogen or ammonium.

The actual procedure employed for carrying out the fluid treatment on the aluminosilicate may be accomplished in a batch-wise or continuous method under atmospheric, subatmospheric or superatmospheric pressure. A solution of the hydrogen ion ammonium ion, or desired metal cation in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or vaporization temperature of the acid or metal compound is below the decomposition temperature of the aluminosilicate.

As has heretofore been pointed out in one embodiment, the novel catalyst composites of this invention comprise a physical mixture of at least two different cracking components, one being an aluminosilicate having a pore size less than 7, and preferably between 5 and 6.8 Angstrom units and the other being an aluminosilicate having a pore size greater than 8 Angstrom units. The catalyst composites of this invention are prepared merely by mechanically mixing together the two cracking components. For hydrocracking operation, the two cracking components can be mechanically mixed together and a suitable hydrogenation-dehydrogenation component can be deposited on at least one component by conventional impregnation techniques either before, after or during mixing. The catalyst composites of this invention may be used in the form of a powdered mixture in a fluidized type of reactor merely by mechanically mixing the components and grinding them down to a powdered form. Alternatively, the catalyst composite may be pelleted, cast, molded, or otherwise formed into pieces of desired size and shape such as rods, spheres, pellets, etc., it being preferred however, that each of said pieces is composed of particles of all components.

A preferred embodiment of this invention resides in the use of an aluminosilicate as the cracking catalyst of generalized competence and the use of a porous matrix as a binder therefor. Therefore, the most preferred class of catalysts falling within the scope of this invention would include a system containing an aluminosilicate having a pore size of from 5 to 6.8 Angstrom units, and an aluminosilicate having a pore size greater than 8 Angstrom units which are combined, dispersed or otherwise intimately admixed with a porous matrix in such proportions that the resulting product contains from 1% to 95% by weight, and preferably from 25% to 90% by weight, of the aluminosilicates in the final composite. It is to be understood that both aluminosilicates need not be mixed with the same matrix, but that many matrices may be employed. Preferably, both aluminosilicates will be combined with the same matrix particle.

The term "porous matrix" includes inorganic and organic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, activated charcoal, organic resins, such as polyepoxides, polyamides, polyesters, vinyl resins, phenolics, amino resins, mellamines, acrylics, alkyds, epoxy resins, etc., and inorganic oxides. Of these matrices, catalytically active inorganic oxides such as clay, acid treated clay, silica-alumina, etc., are particularly preferred because of their superior porosity, attrition resistance, and stability under reaction conditions, especially those reaction conditions encountered in the cracking of gas oil.

The compositing of the aluminosilicate with an inorganic oxide can be achieved by several methods wherein the aluminosilicates are reduced to a particle size less than 40 microns, preferably less than 10 microns, and intimately admixed with an inorganic oxide while the latter is in a hydrous state such as in the form of hydrosol, hydrogel, wet gelatinous precipitate, or in a dried state, or a mixture thereof. Thus, finely divided aluminosilicates can be mixed directly with a siliceous gel formed by hydrolyzing a basic solution of alkali metal silicate with an acid such as hydrochloric, sulfuric, acetic, etc. The mixing of the three components can be accomplished in any desired manner, such as in a ball mill or other types of mills. The aluminosilicates also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Pat. No. 2,384,946. The aluminosilicate siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example, by adding ammonium hydroxide, ammonium carbonate, etc., to a salt of aluminum, such aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel, or wet gelatinous precipitate or hydrous oxide, or in the dried state.

The catalytically inorganic oxide matrix may also consist of a plural gel comprising a predominant amount of silica with one or more metals or oxides thereof selected from Groups IB, II, III, IV, V, VI, VII, and VIII of the Periodic Table. Particular preference is given to plural gels or silica with metal oxides of Groups IIA, III and IVA of the Periodic Table, especially wherein the metal oxide is rare earth oxide, magnesia, alumina, zirconia, titania, beryllia, thoria, or combination thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent.

The catalytically active inorganic oxide may also consist of raw clay or a clay mineral which has been treated with an acid medium to render it active. The aluminosilicate can be incorporated into the clay simply by blending the two and fashioning the mixture into desired shapes. Suitable clays include attapulgite, kaolin, sepiolite, polygarskite, kaolinite, halloysite, plastic ball clays, bentonite, montmorillonite, illite, chlorite, etc.

Other useful matrices include powdered metals, such as aluminum, stainless steel, and powders of refractory oxides, such as $\alpha$ alumina, etc., having very low internal pore volume. Preferably, these materials have substantially no inherent catalytic activity of their own.

The catalyst product can be precalcined in an inert atmosphere near the temperature contemplated for conversion but may be calcined initially during use in the conversion process. Generally, the catalyst is dried between 150° and 600° F. and thereafter calcined in air or an inert atmosphere of nitrogen, helium, flue gas or other inert gas at temperatures ranging from about 500° to 1,500° F. for periods of time ranging from 1 to 48 hours or more. It is to be understood that the aluminosilicate can also be calcined prior to incorporation into the inorganic oxide gel. It is also to be understood that the aluminosilicate or aluminosilicates need not be treated with the fluid mediums previously set forth prior to incorporation in a matrix but can be so treated during or after incorporation into the matrix.

It has been further found in accordance with the invention that catalysts of improved selectivity and having other beneficial properties in some hydrocarbon conversions, e.g., gas oil cracking, are obtained by subjecting the catalyst product to a mild steam treatment carried out at elevated temperatures of 800° to 1,500° F. and preferably at temperatures of about 1,000° F. to 1,400° F. The treatment may be accomplished in an atmosphere of 100% steam or in an atmosphere consisting of steam and a gas which is substantially inert to the aluminosilicate. The steam treatment apparently provides beneficial properties in the aluminosilicate compositions and can be conducted before, after or in place of the calcination treatment.

The particle size of each individual component making up the catalyst system is not narrowly critical and can vary from less than 200 microns although particle sizes within the range of from less than 1 to 100 microns are preferred. It is also to be noted that each individual component in the catalyst system need not be of the same particle size, and in fact, it is preferred that they be of different particle sizes since this affords a means of ready separation of the catalyst components. As indicated previously, the catalyst mixture may be in the form of discrete particles or the mixture may be in the form of components which have been finely ground, admixed and pelleted so that each large particle contains particles of all components.

The particular proportion of one component to the other in the catalyst system is also not narrowly critical and can vary over an extremely wide range. However, it has been found that for most purposes the weight ratio of the aluminosilicate having a pore size less than 7 Angstrom units to the cracking component can range from 1:50 up to 50:1 and preferably from 1:10 up to 10:1, and still more preferably 1:5 to 5:1.

For hydrocracking operations, the amount of the hydrogenation-dehydrogenation component employed is not narrowly critical and can range from about 0.01 to about 30 weight percent based on the entire catalyst. A variety of hydrogenation components may be combined with the cracking component in any feasible manner which affords intimate contact of the components, employing well known techniques such as impregnation, coprecipitation, cogellation, mechanical admixture of one component with the other, and the like. The hydrogenation component can include metals, oxides and sulfides of metals of the Periodic Table which fall in Group VIB including chromium, molybdenum, tungsten and the like, and Group VIII including cobalt, nickel, platinum, palladium, rhodium and the like and combinations of metals, sulfides and oxides of metals of Group VIB and VIII, such as nickel-tungsten-sulfide, cobalt oxide-molybdenum oxide and the like.

One known method in the art involves introducing metal cations in the internal sorption areas of the aluminosilicates followed by reduction of at least a portion of the metallic cations associated with the aluminosilicate with any suitable reducing agent such as lithium aluminum hydride, hydrogen, carbon monoxide, hydrazine, lithium borohydride, sodium borohydride, boranes, metallic lithium, sodium and potassium, etc. The method of reducing at least a portion of the metallic cations to the elemental metal is particularly advantageous for depositing elemental copper, silver, cadmium, mercury, thallium, tin, lead, iron, cobalt and nickel within the internal sorption areas of the composition.

Still another method for depositing elemental metal within the internal sorption areas of the cracking catalyst having a pore size greater than 8 Angstrom units and/or the aluminosilicate having a pore size of less than 7 Angstrom units would involve vaporizing the desired metal and entrapping it in an inert gas and passing the metal vapor containing gas through the desired substance.

Other methods of depositing elemental metals within the internal sorption areas which are particularly effective when comparatively large pore size materials are desired to be so treated, would include treatment with a fluid decomposable compound of the desired metal followed by reduction of said decomposable compound to the elemental metal. This procedure involves dehydration of the catalyst followed by merely passing the decomposable compounds through a bed of said catalyst until at least a part of said compound enters within the internal sorption areas of the catalyst. The reduction of the fluid decomposable compound can conveniently be carried out simply by the action of heat or by chemical means, such as desired. Examples of decomposable compounds which can be employed would be carbonyls, carbonyl hydrides, acetyl acetonate complexes of the particular metal, reducible halides and the like, such as chromium hexacarbonyl, bistolulyl chromium, nickel carbonyl, cobalt carbonyl, iron carbonyl, iron carbonyl hydride, cobalt carbonyl hydride, molybdenum carbonyl, tungsten carbonyl, manganese carbonyl, copper acetyl acetonates, silver acetyl acetonates, gold acetyl acetonates, reducible halides and nitrates such as those of platinum, palladium, selenium, tellurium, copper, silver and gold. Similarly, haloacids such as chloroplatinic, chloropalladic, etc., may also be used.

Another method of incorporating elemental metals in the internal sorption areas of the solid cracking catalyst and/or the aluminosilicate would reside in treatment of the desired material with a metal ammine complex and then reducing the ammine complex to obtain the elemental metal. Although the particular metal ammine complex which is employed is not critical, particularly advantageous are those complexes of platinum, palladium, rubidium, osmium, iridium and rhodium. The techniques for depositing elemental metal within the internal absorption areas of compounds is known to the art and is disclosed in U.S. Pat. Nos. 3,013,982; 3,013,983; 3,013,984; 3,013,984; 3,013,985; 3,013,986; 3,013,987 and 3,013,988.

Within the above description of the aluminosilicates which can be physically admixed in a porous matrix to prepare the catalysts of this invention, it has been found that certain aluminosilicates provide superior results when employed in catalytic cracking and hydrocracking operations. First of all, it is preferred that each aluminosilicate which is composited have at least 0.3 to 1.0, and more preferably 0.5 to 1.0, total equivalents of exchangeable cations per gram atom of anionic aluminum. It has been found that aluminosilicates with a high degree of exchangeable cations give superior results. Secondly, it is preferred that there be a limited amount of alkali metal cations associated with the aluminosilicates since the presence of alkali metals tends to suppress or limit catalytic properties, the activity of which as a general rule decreases with increasing content of alkali metal cations. Therefore, it is preferred that the aluminosilicates contain no more than 0.25 equivalents per gram atom of aluminum and more preferably no more than 0.15 equivalents per gram atom of aluminum of alkali metal cations.

With regard to the metal cations associated with the aluminosilicate, the general order of preference is first cations of trivalent metals, followed by cations of divalent metals, with the least preferred being cations of monovalent metals. Of the trivalent metal cations, the most preferred are rare earth metal cations, either individually or as mixtures of rare earth metal cations.

Additionally, it is particularly preferred to have at least some protons or proton precursors associated with the aluminosilicate. Therefore, the most preferred class of catalysts would be acid-metal aluminosilicates or more particularly acid-rare earth aluminosilicates wherein the metal would represent 40 to 85% of the total equivalents.

Additionally, it is preferred that either or both of the aluminosilicates have an atomic ratio of silicon to aluminum of at least 1.5, preferably 1,8 and even more desirable at least 2.0.

It is to be understood, however, that this invention includes the use of catalyst compositions wherein both aluminosilicates are of the same class, e.g., both metal aluminosilicates; of different classes, e.g., one metal and one acid aluminosilicate; in the same matrix or in different matrices, i.e., one aluminosilicate in silica-alumina and the other in silica-zirconia.

Cracking operations carried out with the catalysts prepared in accordance with the invention may be effected at temperatures ranging from about 400° to 1,300° F. under reduced, atmospheric or superatmospheric pressure. The catalyst can be utilized in the form of spheroidal particles or beads disposed in a stationary bead or in the fluid procedures wherein the catalyst is disposed in a reaction zone to which catalyst is continuously added and from which catalyst is continuously removed. Particularly effective cracking processes can be achieved when the catalyst is used to obtain the inherent advantages realized in moving bed techniques such as the Thermofor Catalytic Cracking Process as well as in fluidized cracking processes.

Hydrocarbon charge stocks undergoing hydrocracking in accordance with this invention comprise hydrocrackable hydrocarbons generally, and in particular petroleum fractions having an initial boiling point of at least 400° F., a 50% point of at least 500° F., and an end point of at least 600° F. Such hydrocarbon fractions include gas oils, residual oils, cycle stocks, whole top crudes and heavy hydrocarbon fractions derived by the destructive hydrogenation of coal, tars, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

Hydrocracking in accordance with the present process is generally carried out at a temperature between 400° F. and about 950° F. The hydrogen pressure in such operation is generally within the range of about 100 and about 3,000 p.s.i.g. and preferably about 350 to about 2,000 p.s.i.g. The liquid hourly space velocity, i.e., the liquid volume of hydrocarbon per hour per volume of catalyst is about 0.1 and about 10. In general the molar ratio of hydrogen to hydrocarbon charge employed in between about 2 and about 80, and preferably between about 5 and about 50.

The process of this invention may be carried out in equipment suitable for catalytic operations. The process may be operated batchwise. It is preferable, however, and generally more feasible, to operate continuously. Accordingly, the process is adapted to operations using a fixed bed of catalyst. Also the process can be operated using a moving bed of catalyst wherin the hydrocarbon flow may be concurrent on countercurrent to the catalyst flow. A fluid type of operation may also be employed with the catalyst described herein. After hydrocracking the resulting products may suitably be separated from the remaining components by conventional means such as adsorption, distillation, etc. Also the catalyst, after use over an extended period of time, may be regenerated with hydrogen or in accordance with conventional procedures, by burning off carbonaceous deposits from the surface of the catalyst in an oxygen containing atmosphere under the conditions of elevated temperature.

Although the process of the invention has been described as having both the cracking catalyst of generalized competence and the aluminosilicate having a pore size less than 7 Angstrom units in the same reaction zone, another embodiment of this invention resides in carrying out two separate cracking or hydrocracking operations, one with one component of the catalyst composition and one with the other component. Thus, this invention will include hydrocracking a feed stream with a cracking catalyst of generalized competence and then recracking the reaction products obtained with an aluminosilicate having a pore size less than 7 Angstrom units or vice versa. It is to be understood, however, that this embodiment of the invention is not the preferred one since the necessity of having two separate hydrocracking operations is not as economically attractive as when both components of the catalyst are present in the same reaction zone.

The high catalytic activities attained by the catalyst system prepared in accordance with this invention are illustrated in connection with the cracking of the representative hydrocarbons. In the examples hereinafter set forth, various reference catalysts will be employed in order to show specific advantages as well as a reference catalyst consisting of conventional silica-alumina bead type cracking catalysts. The silica-alumina catalyst contained about 10 weight percent $Al_2O_3$ and the remainder $SiO_2$. In some instances it also contained a trace amount of $Cr_2O_3$, i.e., about 0.15 weight percent.

The selectivity of the catalyst system is further illustrated by its ability to catalyze the conversion of a midcontinent gas oil having a boiling range of 450°–950° F. to gasoline having an end point of 410° F. Vapors of the gas oil are passed through the catalyst composition at temperatures of 875° or 900° F. substantially at atmospheric pressure at a feed rate of 1.5 to 8.0 volumes of liquid oil per volume of catalyst per hour. The method of evaluating the instant catalyst compositions was to compare the various product yields obtained with such catalysts with yields of the same products given by various reference catalysts at the same conversion level and at the same temperature. However, when the expression Δ advantage is used in the examples, it represents the yields given by the present catalyst minus the yields given by the conventional silica-alumina catalysts above described. In each of the tests shown in the examples, the catalyst compositions were precalcined at about 1,000° F. prior to their evaluation as cracking catalysts.

The following examples illustrate the best mode now contemplated for carrying out the invention.

Examples 1 – 28 will illustrate various specific catalyst formulations operable in the process of this invention. In every case all proportions are by weight.

Examples 29 – 51 will illustrate detailed preparations of some of the catalysts listed below as well as comparisons of cracking data with various other prior art catalysts.

Examples 52 – 53 illustrate the preparation and use of the catalyst composition for hydrocracking operations.

hours at 1,200° F. with steam at 15 p.s.i.g. to yield a catalyst having a rare earth content, determined as rare earth oxides, of 7.42 weight percent.

The following table shows the conversion obtained with the above catalyst, as well as comparisons with a conventional silica-alumina cracking catalyst when evaluated for cracking gas oil at 900° F.:

| | |
|---|---|
| Conversion, Vol. % | 64.2 |
| ΔAdvantage ($C_5$ + gaso.) Vol. % | +5.6 |
| Octane No. ($C_5$ + gaso.) | 97.2 |
| Δ Advantage Octane No. ($C_5$ + gaso.) | −1.6 |

From the above table it can be seen that the catalyst prepared in accordance with the procedure of this example provided 5.6 volume percent more gasoline than a conventional silica-alumina cracking catalyst, but that this increase in yield of gasoline was at the expense of octane number, in that the octane number of the gasoline obtained was 1.6 numbers less than the octane number of gasoline obtained by silica-alumina.

EXAMPLE 30

Another catalyst was prepared substantially the same

| Ex. No. | >8 ANGSTROM UNITS Specific Material | % | <7 ANGSTROM UNITS Specific Material | % | MATRIX Specific Material | % |
|---|---|---|---|---|---|---|
| 1 | Silica-alumina | 80 | 5A | 20 | None | |
| 2 | Silica-alumina | 90 | gmelinite | 10 | None | |
| 3 | Silica Magnesia | 70 | ZK-4 | 30 | None | |
| 4 | Silica-zirconia | 50 | ZK-5 | 25 | McNamee clay | 25 |
| 5 | Silica-titania | 85 | Rare earth A | 15 | None | |
| 6 | Silica-alumina | 75 | Zeolite L | 25 | None | |
| 7 | Silica-alumina | 75 | Rare earth A | 25 | None | |
| 8 | Silica-magnesia | 90 | Rare earth A | 10 | None | |
| 9 | Alumina-boria | 85 | chabazite | 15 | None | |
| 10 | 13X | 85 | 5A | 15 | None | |
| 11 | 13X | 10 | 5A | 10 | Silica-alumina | 80 |
| 12 | Lanthanum 13X | 15 | Acid 5A | 10 | Silica-alumina | 75 |
| 13 | Zeolite L | 85 | RE-chabazite | 15 | None | |
| 14 | Acid L | 50 | Mn-gmelinite | 50 | None | |
| 15 | Ce-Y | 15 | Ca chabazite | 10 | Silica | 75 |
| 16 | RE 13X | 10 | Nickel loaded 5A | 10 | Alumina-boria | 80 |
| 17 | Ni-Y | 18 | RE-acid A | 12 | Silica-alumina | 70 |
| 18 | Be-X | 15 | Acid chabazite | 10 | Silica-alumina | 75 |
| 19 | RE-acid 13X | 10 | RE-acid 5A | 5 | Silica-alumina | 85 |
| 20 | RE-Mg 13X | 15 | Li-chabazite | 10 | Silica | 75 |
| 21 | RE-acid 13X | 10 | RE-acid mordenite | 5 | Silica-alumina McNamee Clay | 75 10 |
| 22 | Acid Y | 15 | Acid mordenite | 10 | Silica-alumina | 75 |
| 23 | RE-acid Y | 10 | RE A | 5 | McNamee Clay | 85 |
| 24 | Acid Y | 10 | RE A | 10 | McNamee Clay | 80 |
| 25 | RE-acid X | 60 | RE Acid-A | 40 | None | |
| 26 | Acid Y | 15 | Silver loaded erionite | 10 | Silica-alumina | 75 |
| 27 | Acid faujasite | 15 | Acid erionite (offretite) | 10 | Silica | 75 |
| 28 | Acid Y + 13X | 15 | RE 5A | 10 | Silica-alumina | 75 |

EXAMPLE 29

Ten parts by weight of a synthetic crystalline alumino-silicate identified as Zeolite 13X was dispersed into 90 parts by weight of a silica-alumina matrix consisting of 94 weight percent $SiO_2$ and 6 weight percent $Al_2O_3$ to form a bead hydrogel. The resulting beads were then treated twice with an aqueous solution consisting of 2 percent by weight of a mixture of rare earth chlorides (as the hexahydrates) for 4 hours, each time, at room temperature, followed by treatment with a 1 percent aqueous solution of ammonium chloride for 24 continuous hours. The aluminosilicate composition was then washed with water until the effluent was substantially free of chloride ions, dried and then treated for 24 as in accordance with the procedure in Example 29 with the exception that an aluminosilicate having a pore size less than 7 Angstrom units was included in the catalyst composite. The exact procedure for the preparation of the catalyst was as follows: 10 parts by weight of the synthetic crystalline aluminosilicate identified as Zeolite 13X and 5 parts by weight of a synthetic crystalline aluminosilicate identified as Zeolite 4A, were dispersed into 85 parts by weight of the silica-alumina matrix consisting of 94 weight percent $SiO_2$ and 6 weight percent $Al_2O_3$ to form a bead hydrogel. The resulting beads were then treated with a 2 percent by weight aqueous solution of a mixture of rare earth chlorides hexahydrate for one 16-hour contact at room temperature, followed by treatment with a 1 percent by weight aqueous solution of ammonium chloride for 24 continuous hours at room temperature. The aluminosilicate composition was then washed with water until the effluent was substantially free of chloride ions, dried and then treated for 24 hours at 1,200° F. with steam at 15 p.s.i.g. to yield a catalyst having a rare earth content, determined as rare earth oxides, of 5.91 weight percent and a sodium content of 0.01 weight percent.

The following table shows the cracking data of the catalyst when evaluated for cracking gas oil at 900° F. as well as comparisons with a conventional silica-alumina cracking catalyst:

| | |
|---|---|
| Conversion, Vol. % | 60.0 |
| ΔAdvantage ($C_5$ + gaso.) Vol. % | +5.2 |
| Octane No. ($C_5$ + gaso.) | 98.1 |
| Δ Advantage Octane No. ($C_5$ + gaso.) | −0.7 |

From the above table it can be seen that the addition of an aluminosilicate having a pore size less than 7 Angstrom units resulted in the production of gasoline in substantially the same amount as that obtained by the catalyst in Example 29. (Δ+5.6 as opposed to Δ+5.2) but at a substantially higher octane number, that is, 98.1 as opposed to 97.2. Therefore, it can be seen that the incorporation of an aluminosilicate which is selective for cracking normal paraffins resulted in remedying to a substantial extent the inherent defect of the catalyst of Example 29 in octane number as a result of its ability to produce higher yields of gasoline.

EXAMPLE 31

A catalyst was prepared in substantially the same manner of Example 30 with the exception that some raw McNamee clay was also added to illustrate that the matrix can consist of more than one component. The exact procedure for the preparation of this catalyst consisted of incorporating 10 parts by weight of synthetic crystalline aluminosilicate identified as Zeolite 13X and 5 parts by weight of synthetic crystalline aluminosilicate identified as Zeolite 4A were dispersed into 10 parts by weight of raw McNamme clay and 75 parts by weight of silica-alumina consisting of 94 weight percent $SiO_2$ and 6 weight percent $Al_2O_3$ to form a bead hydrogel. The resulting bead hydrogel was treated with a 2 percent by weight aqueous solution of a mixture of rare earth chlorides hexahydrate for 16 hours, followed by treatment with a 1% by weight aqueous solution of ammonium chloride for 24 continuous hours. The aluminosilicate composition was then washed with water until there were substantially no chloride ions in the effluent, dried and then treated for 24 hours at 1200° F. with steam at 15 p.s.i.g. to yield a catalyst having a rare earth content, determined as rare earth oxides, of 6.44 weight percent, and a sodium content of 0.1 weight percent.

The following table shows the cracking data of the catalyst when evaluated for cracking gas oil at 900° F.:

| | |
|---|---|
| Conversion, Vol. % | 65.5 |
| Δ Advantage ($C_5$ + gaso.) Vol. % | +7.0 |
| Octane No. ($C_5$ + gaso.) | 97.7 |

From the above table it can be seen that the catalyst of this example not only gave a higher octane number product than that of Example 29 (97.7 as opposed to 97.2) but also gave a higher yield of gasoline as shown from the Δ advantage of $C_5$ + gasoline.

EXAMPLE 32

10 Parts by weight of a synthetic crystalline aluminosilicate identified as Zeolite 13X, 5 parts by weight of a crystalline aluminosilicate identified as sodium mordenite, and 10 parts by weight of raw McNamee clay were dispersed into 75 parts by weight of a silica-alumina matrix consisting of 94 weight percent $SiO_2$ and 6 weight percent $Al_2O_3$ to form a bead hydrogel. The resulting composition was treated with a 2 percent by weight aqueous solution of rare earth chlorides hexahydrate for 16 hours followed by treatment with a 1 percent by weight aqueous solution of ammonium chloride for 24 continuous hours. The aluminosilicate composition was then washed with water until there were substantially no chloride ions in the effluent, dried and then treated for 24 hours at 1200° F. with steam at 15 p.s.i.g. to yield a catalyst having a rare earth content, determined as rare earth oxides, of 3.02 weight percent and a sodium content of 0.1 weight percent.

The following table shows the cracking data of the catalyst when evaluated for cracking gas oil at 900° F.

| Cracking Data | |
|---|---|
| Conversion, Vol. % | 59.5 |
| LHSV | 4 |
| 10 R.V.P. Gaso., Vol. % | 50.8 |
| Excess $C_4$'s, Vol. % | 12.0 |
| $C_5$ + gasoline, Vol. % | 48.6 |
| Total $C_4$'s, Vol. % | 14.2 |
| Dry Gas, Wt. % | 5.9 |
| Coke, Wt. % | 2.2 |
| $H_2$, Wt. % | 0.04 |
| Δ Advantage | |
| 10 R.V.P. Gaso., Vol. % | +6.8 |
| Excess $C_4$'s, Vol. % | −1.5 |
| $C_5$ + gasoline, Vol. % | +6.6 |
| Total $C_4$'s, Vol. % | −1.3 |
| Dry Gas, Wt. % | −1.4 |
| Coke, Wt. % | −2.2 |
| Octane number of gasoline obtained | 96.9 |

From the above table it can be seen that the use of sodium mordenite in the catalyst composition of this example resulted in obtaining more yield of $C_5$ + gasoline than in Example 29, at substantially the same octane number, 96.9 as opposed to 97.2.

EXAMPLE 33

10 parts by weight of a synthetic crystalline aluminosilicate identified as Zeolite 13X, 5 parts by weight of a crystalline aluminosilicate identified as chabazite, and 10 parts by weight of raw McNamee clay were dispersed into 75 parts by weight of a silica-alumina matrix consisting of 94 weight percent $SiO_2$ and 6 weight percent $Al_2O_3$ to form a bead hydrogel. The resulting bead hydrogel was treated with a 2 percent by weight aqueous solution of rare earth chlorides hexahydrate for 16 hours followed by a 24 hour continuous treatment with a 1% by weight aqueous solution of ammonium chloride. The aluminosilicate composition was then washed with water until there were substantially no chloride ions in the effluent, dried and then treated for 24 hours at 1200° F. with steam at 15 p.s.i.g. to yield a catalyst having a rare earth content, determined as rare earth oxides, of 5.5 weight percent and a sodium content of 0.1 weight percent.

The following table shows the cracking data of the catalyst when evaluated for cracking gas oil at 900° F.:

| Cracking Data | |
|---|---|
| Conversion, Vol. % | 60.5 |
| LHSV | 4 |
| 10 R.V.P. Gasoline, Vol. % | 50.9 |
| Excess $C_4$'s, Vol. % | 11.9 |
| $C_5$ + gasoline, Vol. % | 48.4 |
| Total $C_4$'s, Vol. % | 14.4 |
| Dry Gas, Wt. % | 6.7 |
| Coke, Wt. % | 2.1 |
| $H_2$, Wt. % | 0.04 |
| Δ Advantage | |
| 10 R.V.P. Gaso., Vol. % | +6.2 |
| Excess $C_4$'s, Vol. % | −2.0 |
| $C_5$ + gasoline, Vol. % | +5.8 |
| Total $C_4$'s, Vol. % | −1.5 |
| Dry Gas, Wt. % | −0.8 |
| Coke, Wt. % | −2.5 |
| Octane number of gasoline | 97.3 |

EXAMPLE 34

100% silica-alumina consisting of 90 weight percent $SiO_2$ and 10 weight percent $Al_2O_3$ was used to crack gas oil at 900° F. at atmospheric pressure. The results obtained from cracking gas oil are as follows:

| | |
|---|---|
| Conversion, Vol. % | 51.3 |
| Δ Advantage ($C_5$ + gaso.) Vol. % | −0.6 |
| Octane No. ($C_5$ + gaso.) | 98.8 |

The procedure of Example 34 was repeated with the exception that 25 parts by weight of a synthetic crystalline aluminosilicate identified as Zeolite 4A which had been treated with an aqueous solution containing rare earth chlorides was added and the resulting catalyst composition steamed in the same manner as Example 34.

When the above catalyst was evaluated for cracking gas oil at 900° F. the following results were obtained:

| | |
|---|---|
| Conversion, Vol. % | 49.7 |
| Δ Advantage ($C_5$ + gaso.) Vol. % | +2.3 |
| Octane No. ($C_5$ + gaso.) | 98.4 |

From the above table it can be seen that the addition of an aluminosilicate having a pore size of less than 7 Angstrom units resulted in substantially the same octance number of gasoline but at an almost 3 volume percent increase in yield.

EXAMPLE 36

100% of commercially available silica-magnesia was subjected to a 24 hour treatment at 1200° F. with steam at 15 p.s.i.g. and then evaluated for the cracking of gas oil at 900° F. with the following results:

| | |
|---|---|
| Conversion, Vol. % | 62.7 |
| Δ Advantage ($C_5$ + gaso.) Vol. % | +8.3 |
| Octane No. ($C_5$ + gaso.) | 94.0 |

EXAMPLE 37

10 parts by weight of a synthetic crystalline aluminosilicate identified as Zeolite 4A which had been treated with an aqueous solution containing a mixture of rare earth chlorides was incorporated in 90 parts by weight of commercially available silica-magnesia and the resulting composition treated with steam for 20 hours at atmospheric pressure at 1225° F. The resulting catalyst composite was evaluated for the cracking of gas oil at 900° F. and the following were the results obtained:

| | |
|---|---|
| Conversion, Vol. % | 66.4 |
| Δ Advantage ($C_5$ + gaso.) Vol. % | +7.5 |
| Octane No. ($C_5$ + gaso.) | 95.0 |

From the above table it can be seen that the addition of the aluminosilicate having a pore size less than 7 Angstrom units resulted in an increase in 1 whole octane number in the product obtained when compared with the results of Example 36.

EXAMPLE 38

10 parts by weight of the synthetic crystalline aluminosilicate identified as Zeolite Y was dispersed into 90 parts by weight of a silica-alumina matrix consisting of 94 weight percent $SiO_2$ and 6 weight percent $Al_2O_3$ to form a bead hydrogel. The resulting bead hydrogel was treated with a 2 percent by weight aqueous solution of rare earth chlorides hexahydrate for 16 hours, followed by treatment with a 1 percent by weight aqueous solution of ammonium chloride for 24 continuous hours. The aluminosilicate composition was then washed with water until there were substantially no chloride ions in the effluent, dried and then treated for 48 hours at 1200° F. with steam at 15 p.s.i.g. to yield a catalyst having a rare earth content, determined as rare earth oxides, of 4.79 weight percent.

| | |
|---|---|
| Conversion, Vol. % | 64.2 |
| Δ Advantage ($C_5$ + gaso.) Vol. % | +8.7 |
| Octane No. ($C_5$ + gaso.) | 96.0 |

EXAMPLE 39

10 parts by weight of a synthetic crystalline aluminosilicate identified as Zeolite Y and 5 parts by weight of a synthetic crystalline aluminosilicate identified as Zeolite 4A, both of which had been treated with a solution containing rare earth chlorides hexahydrate, and 10 parts by weight of raw McNamee clay, were dispersed into 75 parts by weight of a silicaalumina matrix containing 94 parts by weight $SiO_2$ and 6 weight percent $Al_2O_3$ to form a bead hydrogel. The resulting composition was then treated with a 1.4 weight percent aqueous solution of ammonium sulfate for 12 contacts, each contact being 2 hours in duration. The catalyst was then washed with water until the effluent was substantially free of both chloride and sulfate ions, dried, then treated for 24 hours with steam at 1200° F. and 15 p.s.i.g. to yield a catalyst having a sodium content of 0.3 weight percent.

The above catalyst was then evaluated for cracking gas oil at 900° F. with the following results:

| | |
|---|---|
| Conversion, Vol. % | 63.0 |
| Δ Advantage, ($C_5$ + gaso.) Vol. % | +8.9 |
| Octane No. ($C_5$ + gaso.) | 96.6 |

From the above table it can be seen that the addition of an aluminosilicate having a pore size of less than 7 Angstrom units resulted in the production of gasoline in substantially the same yield as that obtained by the catalyst of Example 38 but at a higher octane number.

EXAMPLE 40

10 parts by weight of synthetic crystalline aluminosilicate identified as Zeolite Y was dispersed into 90 parts by weight of a silica-alumina matrix consisting of 94 weight percent $SiO_2$ and 6 weight percent $Al_2O_3$ to form a bead hydrogel. The resulting composition was then treated with a 1 percent aqueous solution of ammonium chloride for 3 contacts, each being 16 hours in duration, followed by 9 contacts each of 2 hours in duration with the same solution. The aluminosilicate composition was then washed with water until the effluent was substantially free of chloride ions, dried and then treated for 30 hours with steam at 1200° F. and 15 p.s.i.g. to yield a catalyst having a sodium content of 0.27 weight percent.

The above catalyst was then evaluated for cracking gas oil at 900° F. and the following table shows the results obtained:

| | |
|---|---|
| Conversion, Vol. % | 59.8 |
| Δ Advantage ($C_5$ + gaso.) Vol. % | +5.0 |
| Octane No. ($C_5$ + gaso.) | 97.7 |

EXAMPLE 41

10 parts by weight of acid Zeolite Y prepared by exchanging the sodium form of Zeolite Y with $NH_4CL$ solution, 10 parts by weight of rare earth Zeolite A prepared by treating a synthetic crystalline aluminosilicate identified as Zeolite 4A with a rare earth chloride solution, 80 parts by weight of raw McNamee Clay were blended together dried, pelleted, calcined 10 hours at 1000° F. and then steamed for 24 hours at 1200° F. at 15 p.s.i.g. to obtain a catalyst composition.

The above catalyst composition was then evaluated for cracking gas oil at 900° F. with the following results:

| | |
|---|---|
| Conversion, Vol. % | 49.3 |
| Δ Advantage ($C_5$ + gaso.) Vol. % | +6.2 |
| Octane No. ($C_5$ + gaso.) | 97.8 |

From the above table it can be seen that the use of an aluminosilicate having a pore size less than 7 Angstrom units resulted in 1.2 volume percent increase in the amount of gasoline obtained at approximately the same, if not higher, octane number.

EXAMPLE 42

10 parts by weight of a synthetic crystalline aluminosilicate identified as Zeolite 13X and 5 parts by weight of a synthetic crystalline aluminosilicate identified as Zeolite 4A, were dispersed into 85 parts by weight of a silica-alumina matrix consisting of 94 weight percent $SiO_2$ and 6 weight percent $Al_2O_3$ to form a bead hydrogel. The resulting beads were treated with a 2 percent by weight aqueous solution of rare earth chlorides for 24 continuous hours at room temperature. The aluminosilicate composition was then washed with water until there were no chloride ions in the effluent, dried and then treated for 24 hours at 1200° F. with steam at 15 p.s.i.g. to yield a catalyst having a rare earth content, determined as rare earth oxides, of 11.0 weight percent and a sodium content of 0.04 percent.

EXAMPLE 43

10 parts by weight of a synthetic crystalline aluminosilicate identified as Zeolite 13X, 5 parts by weight of a crystalline aluminosilicate identified as sodium mordenite, and 10 parts by weight of raw McNamee clay were dispersed into 75 parts by weight of a silica-alumina matrix consisting of 94 weight percent $SiO_2$ and 6 weight percent $Al_2O_3$ to form a bead hydrogel. The resulting bead hydrogel was treated with a 2 percent by weight aqueous solution of rare earth chlorides hexahydrate for 24 continuous hours at room temperature. The aluminosilicate composition was then washed with water until there were substantially no chloride ions in the effluent, dried and then treated for 24 hours at 1200° F. with steam at 15 p.s.i.g. to yield a catalyst having a rare earth content, determined as rare earth oxides, of 11.2 weight percent and a sodium content of 0.2 weight percent.

EXAMPLE 44

10 parts by weight of a synthetic crystalline aluminosilicate identified as Zeolite 13X, 5 parts by weight of a crystalline aluminosilicate identified as 5A and 10 parts by weight of raw McNamee clay were dispersed into 75 parts by weight of a silica-alumina matrix consisting of 94 weight percent $SiO_2$ and 6 weight percent $Al_2O_3$ to form a bead hydrogel. The resulting bead hydrogel was treated with a 2 percent by weight aqueous solution of rare earth chlorides hexahydrate for 16 hours followed by treatment with a 1% by weight aqueous solution of ammonium chloride for 24 continuous hours at room temperature. The aluminosilicate composition was then washed with water until there were substantially no chloride ions in the effluent, dried and then treated for 24 hours at 1200° F. with steam at 15 p.s.i.g. to yield a catalyst having a rare earth content, determined as rare earth oxides, of 5.51 weight percent and a sodium content of 0.4 percent by weight.

EXAMPLE 45

10 parts by weight of a synthetic crystalline aluminosilicate identified as Zeolite Y, 5 parts by weight of a crystalline aluminosilicate identified as Zeolite 4A, and 10 parts by weight of raw McNamee clay were dispersed into 75 parts by weight of a silica-alumina matrix consisting of 94 weight percent $SiO_2$ and 6 weight percent $Al_2O_3$ to form a bead hydrogel. The resulting composition was treated with a 2 percent by weight aqueous solution of rare earth chlorides hexahydrate for 16 hours followed by treatment with a 1% by weight aqueous solution of ammonia chloride for 24 continuous hours. The aluminosilicate composition was then washed with water until there were substantially no chloride ions in the effluent, dried and then treated for 24 hours at 1200° F. with steam at 15 p.s.i.g. to yield a catalyst having a rare earth content, determined as rare earth oxides, of 5.1 weight percent and a sodium content of 0.08 percent by weight.

EXAMPLE 46

10 parts by weight of a synthetic crystalline aluminosilicate identified as Zeolite Y which has been treated with solutions of rare earth chlorides hexahydrate and ammonium chloride and 5 parts by weight of a crystalline aluminosilicate identified as Zeolite 5A were dispersed into 85 parts by weight of raw McNamee clay and blended together and pelleted and sized to 4–10 mesh. The resulting composition was then treated for 24 hours at 1200° F. with steam at 15 p.s.i.g. to yield a catalyst having a rare earth content, determined as rare earth oxides, of 1.8 weight percent and a sodium content of 0.39 percent by weight.

EXAMPLE 47

7.5 parts by weight of a synthetic crystalline aluminosilicate identified as Zeolite 13X was treated with a solution containing rare earth cations and then dispersed in 77.5 parts by weight of a silica-alumina matrix containing 15 parts by weight of silica-alumina fines. The resulting compostion was then treated with an ammonium sulfate solution so as to obtain an aluminosilicate having both rare earth cations and hydrogen ions associated therewith. In order to demonstrate the applicability of the above catalyst for fluid type cracking systems, it was spray dried by a conventional semi-countercurrent method wherein air at 800° F. was introduced at the top of the drier in an opposite direction to the flow of catalyst slurry. After spray drying the product was recovered at the bottom of the drier at about 300° to 350° F. to obtain a catalyst having the necessary particle size to be employed in fluid type cracking processes.

EXAMPLE 48

The catalyst of Example 47 was pelleted and sized 4 to 10 mesh, calcined for 10 hours at 1000° F. and then treated for 24 hours at 1200° F with steam at 15 p.s.i.g.

The following Table shows the cracking data of the catalyst when evaluated for cracking gas oil at 900° F.

| | |
|---|---|
| Conversion, Vol. % | 52.9 |
| Advantage ($C_5$ + gaso.) Vol. % | +6.5 |
| Octane No. ($C_5$ + gaso.) | 96.4 |

EXAMPLE 49

Ten parts by weight of a synthetic crystalline aluminosilicate identified as Zeolite 13X, 5 parts by weight of a synthetic crystalline aluminosilicate identified as Zeolite A, and 10 parts by weight of McNamee clay were dispersed into 75 parts by weight of silica-alumina having a composition of 94% $SiO_2$ and 6% $Al_2O_3$. The above composition was formed as a bead hydrogel by the conventional bead-forming method and the resulting bead was contacted for 16 hours with a 2% by weight aqueous solution of rare earth chloride hexahydrate followed by a 24 hour continuous contact with a 1% aqueous solution of ammonium chloride. The alumiosilicate was then washed with water until the effluent was substantially free of chloride ions and then spray-dried in the same manner as Example 47. The spray-dried particles were pelleted, sized 4 by 10 mesh, heated in air for 10 hours at 1000° F. and then treated with steam for 24 hours at 1200° F. at 15 p.s.i.g.

The following table shows the cracking data when the catalyst was evaluated for cracking gas oil at 900° F.:

| | |
|---|---|
| Conversion, Vol. % | 61.0 |
| Advantage ($C_5$ + gaso.) Vol. % | +6.5 |
| Octane No. ($C_5$ + gaso.) | 98.6 |

From the above it can be seen that the incorporation of an aluminosilicate having a pore size of less than 7 Angstrom units resulted in improved catalytic performance as shown by an octane number of 2.2 units higher than that obtained in Example 48.

EXAMPLE 50

A silica-zirconia hydrogel was prepared by gelling soluble alkali silicate with an acid zirconium sulfate solution at 8.0 pH. The hydrogel was then treated with a 1% by weight sulfuric acid solution for 24 hours at 200° F. followed by treatment with a 2% by weight aqueous solution of ammonium chloride for 24 continuous hours. The hydrogel was then dried for 20 hours at 270° F., calcined 10 hours at 1000° F. and then treated for 20 hours at 1225° F. with steam at atmospheric pressure.

The above silica-zirconia catalyst (90 weight percent $SiO_2$ — 10 weight percent $ZrO_2$) was then evaluated for cracking gas oil at 900° F. with the following results:

| | |
|---|---|
| Conversion, Vol. % | 54.6 |
| Advantage ($C_5$ + gaso.) Vol. % | +3.3 |
| Octane No. ($C_5$ + gaso.) | 97.5 |
| Advantage (coke) Wt. % | −1.1 |

EXAMPLE 51

A catalyst composition was prepared by adding 44.7 parts by weight of a rare earth aluminosilicate having a pore size less than 7 Angstrom units to 2340.0 parts by weight of the silica-zirconia hydrogel prepared in accordance with the procedure in Example 50. To the mixture was added 100 parts by weight of water and the entire composition was blended together as a slurry which was charged to a dryer at 230° F. and dried for 20 hours. The composition was then calcined for 10 hours at 1000° F. and treated with steam for 20 hours at 1225° F. at atmospheric pressure. The composition of the catalyst at this point is 90 weight percent silica-zirconia (90–10) and 10 weight percent rare earth Zeolite A.

The above catalyst was then evaluated for cracking gas oil at 900° F. with the following results:

| | |
|---|---|
| Conversion, Vol. % | 55.9 |
| Δ Advantage ($C_5$ + gaso.) Vol. % | +4.6 |
| Octane No. ($C_5$ + gaso.) | 97.5 |
| Δ Advantage (coke) Wt. % | −2.1 |

From the above table it can be seen that the addition of an aluminosilicate having a pore size of less than 7 Angstrom units resulted in the production of about 1.3 units in gasoline with the production of about 1 unit less coke at the same octane number.

EXAMPLE 52

In the preparation of this example two aluminosilicates were initially prepared as follows:

a. A rare earth aluminosilicate was prepared by base-exchanging one pound of a sodium crystalline aluminosilicate (Zeolite 4-A) continuously at 180° F with 240 pounds of 5 weight percent rare earth chloride hexahydrate solution, charging 30 pounds of solution per 24 hour period. The resulting product, after being washed and dried, analyzed 0.4 weight percent sodium.

b. A rare earth-acid faujasite was prepared by baseexchanging 1.1 pounds of a sodium faujasite (derived from the interaction of clay with caustic and Silica) with a mixture of 5 weight percent rare earth chloride hexahydrate and 2 weight percent ammonium chloride solution, using 90 pounds of solution over a 3-day period at a temperature of 180° F. The resulting product, after being washed and dried, analyzed 0.3 weight percent sodium.

23.7 grams of the rare earth-exchanged "A" aluminosilicate (dried overnight at 230° F. to 80% solids (measured at 1000° F.)) as prepared in (a) were mixed with 25.1 grams of the rare earth-acid faujasite (dried overnight at 230° F. to 76% solids (measured at 1000° F.)) as prepared in (b). The mixture was pelleted and sized to 14 – 25 mesh and then calcined ten (10) hours at 1000° F. in air. The calcined particles were treated under vacuum with 23.9 cc of $H_2PtCl_6$ solution containing 0.0122 grams Pt/cc. The resulting catalyst was treated for 20 hours in non-drying conditions (covered containers) at 230° F. The catalyst was then reduced for 2 hours at 450° F. and 2 hours at 950° F. with a flowing stream of hydrogen and finally cooled in a stream of nitrogen.

EXAMPLE 53

A mixed aluminosilicate catalyst was prepared in the following manner:

In the preparation of this catalyst dry powdered components were mixed together in the following amounts:

190 grams (81.45 weight percent solids at 1000° F.) rare earth aluminosilicate (prepared by base-exchanging faujasite (Zeolite X) with a 5% rare earth chloride solution at 180° F., reducing the sodium content to a 0.74 weight percent level) were mixed with 195 grams (79.2 weight percent solids at 1000° F.) of dried rare earth A aluminosilicate as prepared in Example I, and 349 grams (88.4 weight percent solids at 1000° F.) of a kaolin clay (McNamee)). These dry components were mixed in a Waring blended to yield a mixture comprising 25 weight percent rare earth A aluminosilicate — 25 weight percent rare earth X aluminosilicate and 50 weight percent clay as matrix. The dry powder was pelleted and sized to 14 × 25 mesh.

A 105 gram portion of the above particles was calcined for ten (10) hours at 1000° F. and then treated under vacuum with a solution of ammonium molybdate (14.78 grams (85% $MoO_3$) dissolved and diluted to 44.1 cc with water), dried overnight at 230° F. in air, and calcined for 3 hours at 1000° F. in air. These particles were then treated with 11.48 grams of cobalt chloride ($CoCl_2.6H_2O$ dissolved and diluted to 44.1 cc with water), dried overnight at 230° F. in air and finally calcined 3 hours at 1000° F. in air.

The final catalyst analyzed 2.81 weight percent CoO, 7.44 weight percent $MoO_3$ and had a surface area of 71 $m^2/g$.

The catalysts prepared above were evaluated under hydrocracking conditions and compared with two standard catalysts. As shown below, the mixed aluminosilicate catalyst of Example 52 is exceptionally superior to the two standard reference catalysts. At a lower temperature (550° F.), the catalyst of Example 52 gave complete conversion with high efficiency, i.e., high liquid yields and low gas yields, whereas the platinum on silica-alumina catalyst at 750° F. gave only 84% conversion with high yields of the less desirable $C_1 - C_5$ fraction. Similarly, the cobalt molybdena catalyst required a temperature of 800° F. for a 43% conversion of which about one-half of the products were in the less desirable range of $C_1 - C_5$. The catalyst of Example 53 likewise is more active than the standard reference catalysts, requiring a temperature of 550° F. for 48% conversion. The catalyst of Example 53 is also more selective, giving 40 weight percent desirable $C_6 - C_{16}$ fractions with only 6 weight percent less desirable $C_1 - C_5$ fractions. The standard cobaltmolybdena hydrocracking catalysts gave a higher yield (18%) of the less desirable products at 43% conversion.

EVALUATION OF HYDROCRACKING CATALYSTS

Charge: n-Eisocane
Conditions: 1.0 LHSV
1500 p.s.i.g.
8/1 $H_2$/hydrocarbon Mole ratio

| Catalysts | | Example 52 | 0.5% wt Pt on Si/Al 90% SiO + 10% $Al_2O_3$ | 85% (10% $MoO_3$- 3% CoO on $Al_2O_3$) 15% added $SiO_2$ | Example 53 |
|---|---|---|---|---|---|
| Temperature, ° F. | | 500 | 550 | 750 | 800 | 550 |
| Conv. to Products<C20 wt % | | 42 | 100 | 84 | 43 | 48 |
| Product Composition, Wt % | | | | | | |
| $C_1 - C_5$ | | 3 | 10 | 19 | 18 | 6 |
| $C_6 - C_{13}$ | Paraffins | 34 | 85 | 58 | 15 | 40 |
| | Naphthenes | 2 | 5 | 5 | 2 | 3 |
| | Aromatics | | | 1 | 1 | |
| $C_{14} - C_{19}$ | Parraffins | 1 | | 1 | 6 | — |
| | Naphthenes | | | | | — |
| | Aromatics | | | | | — |
| $C_{20}$ | Parraffins | 57 | | 16 | 55 | |
| | Naphthenes | 1 | | | 2 | 51 |
| | Aromatics | | | | | |

What is claimed is:

1. In the catalytic cracking of a hydrocarbon oil to produce hydrocarbons of low boiling range, the improvement which comprises exposing said oil to catalytic cracking conditions by conducting the same serially through two separate reaction zones, one of which contains a catalyst of a crystalline aluminosilicate zeolite having a pore size of less than 7 Angstrom units and the other of which contains a catalyst of a crystalline aluminosilicate zeolite having a pore size greater than 8 Angstrom units.

2. The process of claim 1 wherein at least one aluminosilicate zeolite is embodied in a porous matrix.

3. The process of claim 2 wherein the porous matrix is an inorganic oxide gel.

4. The process of claim 1 wherein one of such zeolites has a pore size of about 5 Angstrom units and the other of such zeolites has a pore size of about 13 Angstrom units.

5. The process of claim 1 wherein at least one of the aluminosilicate zeolites additionally comprises a hydrogenation component.

6. In the catalytic cracking of a hydrocarbon oil to produce hydrocarbons of low boiling range, the improvement which comprises exposing said oil to catalytic cracking conditions by conducting the same serially through two separate reaction zones, one of which contains a catalyst of a crystalline aluminosilicate zeolite having a pore size of from 5 to 6.8 Angstrom units and the other of which contains a catalyst of a crystalline aluminosilicate zeolite having a pore size greater than 8 Angstrom units.

7. The process of claim 6 wherein at least one aluminosilicate zeolite has cations of divalent metal cations associated therewith.

8. The process of claim 6 wherein at least one aluminosilicate zeolite has cations of trivalent metal cations associated therewith.

9. The process of claim 6 wherein at least one aluminosilicate zeolite has hydrogen cations associated therewith.

10. The process of claim 6 wherein at least one aluminosilicate zeolite has both hydrogen cations and metal cations associated therewith.

11. The process of claim 6 wherein at least one aluminosilicate zeolite has rare earth cations associated therewith.

12. The process of claim 6 wherein at least one aluminosilicate zeolite has hydrogen cations and rare earth cations associated therewith.

* * * * *

UNITED STATES PATENT AND TRADEMARK OFFICE
CERTIFICATE OF CORRECTION

PATENT NO. : 4,001,106

DATED : January 4, 1977

INVENTOR(S) : CHARLES J. PLANK and EDWARD J. ROSINSKI

It is certified that error appears in the above-identified patent and that said Letters Patent are hereby corrected as shown below:

Column 2, line 23, "varpor" should be --vapor--.

Column 5, line 33, After the word "products" insert the word --produced--.

Column 5, line 34, Delete "erations.".

Column 6, line 28, After the word "sizes" insert the word --less--.

Column 6, line 38, "$M_2O/n$" should be --$\frac{M_2O}{n}$--.

Column 6, line 52, After the word "of" insert the words --small cavities interconnected by a number of--.

Column 6, line 63, "$M_2O/n$ should be --$\frac{M_2O}{n}$--.

Column 7, line 3, "$AlO_3$" should be --$AlO_2$--.

Column 7, line 28, "$M_2O/n$" should be --$\frac{M_2O}{n}$--.

Column 7, line 36, "8" should be --[--.

Column 7, line 42, "$R_2O/m$" should be --$\frac{R_2O}{m}$-- and "$M_2O/n$" should be --$\frac{M_2O}{n}$--.

Column 7, line 46, "carton" should be --cation--.

UNITED STATES PATENT AND TRADEMARK OFFICE
CERTIFICATE OF CORRECTION

PATENT NO. : 4,001,106
DATED : January 4, 1977
INVENTOR(S) : CHARLES J. PLANK and EDWARD J. ROSINSKI It is certified that error appears in the above-identified patent and that said Letters Patent are hereby corrected as shown below:

Column 7, line 56, "$SiO_2/A/_2O_3$" should be --$SiO_2/Al_2O_3$--.
Column 8, line 22, After the word "precursor" insert the words --with the desired fluid medium until such time as metallic ions originally associated with the precursor --.
Column 8, line 42, "5 to 8" should be --5 and 8--.
Column 15, Table , "Zeolite L" should be --Zeolite $\alpha$--.
Column 19, line 31, Insert "Example 35".

Signed and Sealed this

Twenty-seventh Day of December 1977

[SEAL]

Attest:

RUTH C. MASON
Attesting Officer

LUTRELLE F. PARKER
Acting Commissioner of Patents and Trademarks